United States Patent
Moechnig

(10) Patent No.: US 7,909,346 B2
(45) Date of Patent: Mar. 22, 2011

(54) BICYCLE WITH ASYMMETRIC STEERER TUBE

(75) Inventor: Steven Moechnig, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 142 days.

(21) Appl. No.: 12/420,881

(22) Filed: Apr. 9, 2009

(65) Prior Publication Data

US 2010/0259028 A1 Oct. 14, 2010

(51) Int. Cl.
*B62K 21/00* (2006.01)

(52) U.S. Cl. .................. 280/279; 280/276; 280/280

(58) Field of Classification Search .......... 280/276, 280/279, 280
See application file for complete search history.

(56) References Cited

U.S. PATENT DOCUMENTS

| | | | |
|---|---|---|---|
| 624,182 A | 5/1899 | Cook | |
| 1,511,350 A | 10/1924 | Meiselbach | |
| 2,669,463 A | 2/1954 | Torre | |
| 3,933,373 A | 1/1976 | Gammelgaard | |
| 5,002,297 A | 3/1991 | Klein | |
| 5,181,732 A | 1/1993 | Bezin et al. | |
| 5,273,301 A | 12/1993 | Klein | |
| 5,279,137 A | 1/1994 | Orbell | |
| 5,540,457 A | 7/1996 | Johnson | |
| 5,609,349 A | 3/1997 | Buckmiller et al. | |
| 5,680,798 A | 10/1997 | Luen | |
| 5,782,479 A | 7/1998 | Adams et al. | |
| 5,927,740 A | 7/1999 | Hopey | |
| 5,944,932 A | 8/1999 | Klein et al. | |
| 6,049,982 A | 4/2000 | Tseng | |
| 6,167,780 B1 | 1/2001 | Chen | |
| 6,634,251 B2 | 10/2003 | Chen | |
| 6,655,707 B2 | 12/2003 | Buckmiller et al. | |
| 6,955,371 B2 | 10/2005 | French | |
| 7,052,028 B2 | 5/2006 | Chamberlain | |
| 7,520,520 B2 * | 4/2009 | Callahan et al. | 280/276 |
| 7,537,231 B2 * | 5/2009 | Callahan et al. | 280/276 |
| 7,543,835 B2 * | 6/2009 | Murphy et al. | 280/276 |
| 2004/0050202 A1 | 3/2004 | Montague et al. | |
| 2005/0012299 A1 * | 1/2005 | Schuman et al. | 280/288.3 |
| 2005/0248119 A1 | 11/2005 | Callahan et al. | |
| 2007/0210554 A1 * | 9/2007 | Callahan et al. | 280/279 |
| 2007/0257466 A1 * | 11/2007 | Murphy et al. | 280/276 |
| 2008/0073870 A1 | 3/2008 | Lane | |
| 2008/0303240 A1 * | 12/2008 | Lewis et al. | 280/276 |

FOREIGN PATENT DOCUMENTS

GB 2378927 A 2/2003

* cited by examiner

*Primary Examiner* — Joanne Silbermann
*Assistant Examiner* — Michael R Stabley
(74) *Attorney, Agent, or Firm* — Boyle Fredrickson, S.C.

(57) ABSTRACT

A bicycle steerer tube assembly having an oblong asymmetric cross section formed along a portion of the steerer tube. The asymmetric portion of the steerer tube has a first diameter that is generally aligned with an axis of rotation of the front wheel and a second diameter that is generally aligned with a plane of rotation of the front wheel. The first diameter is greater than the second diameter and provides lateral stiffness to the wheel assembly and the second diameter accommodates longitudinal impact absorption of the fork and wheel assembly.

14 Claims, 3 Drawing Sheets

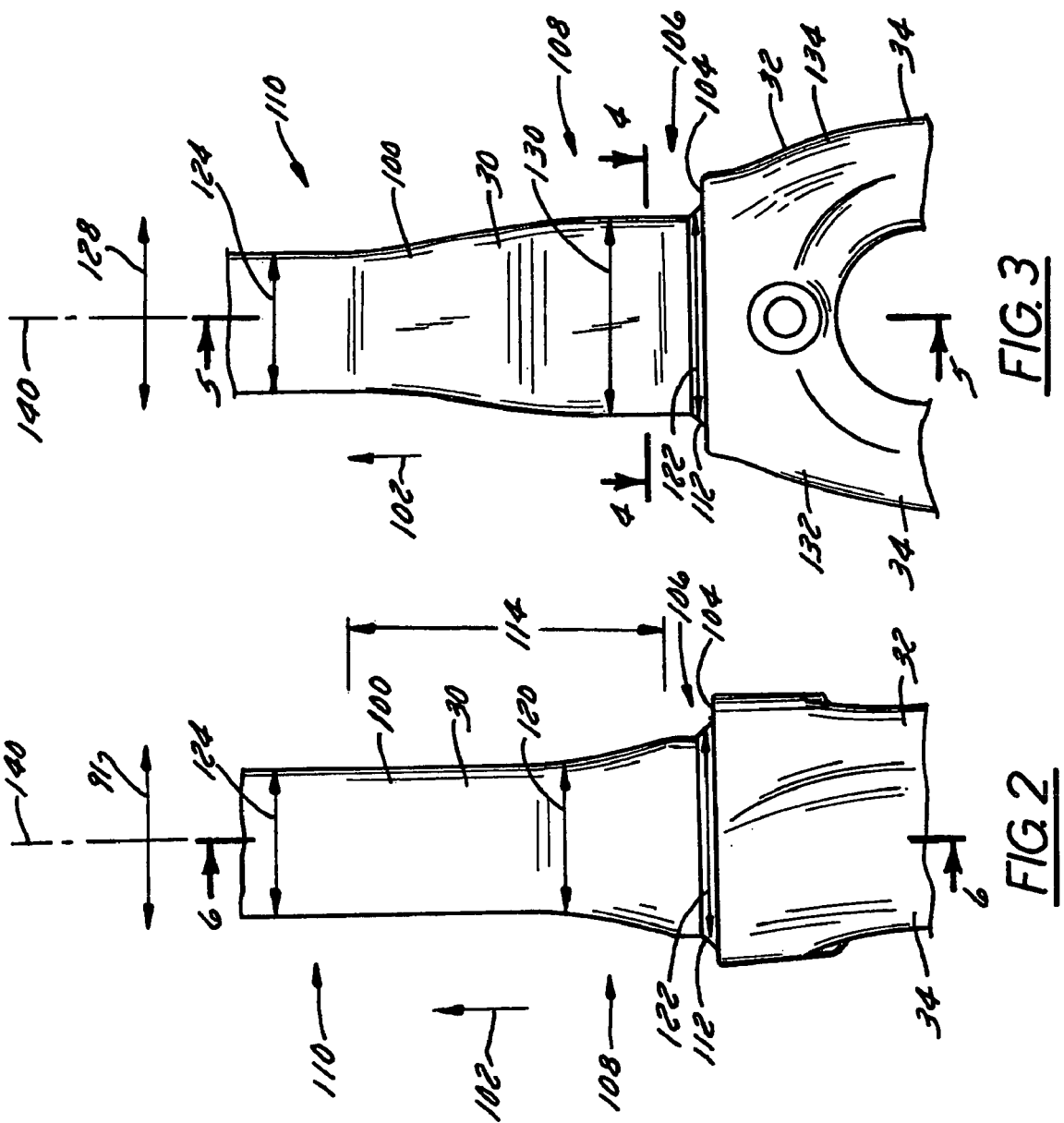

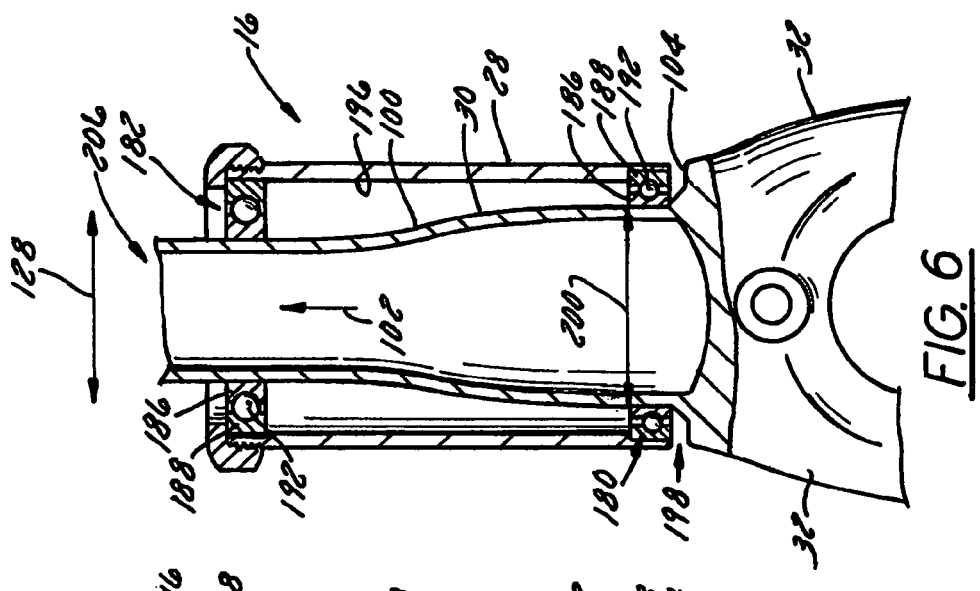
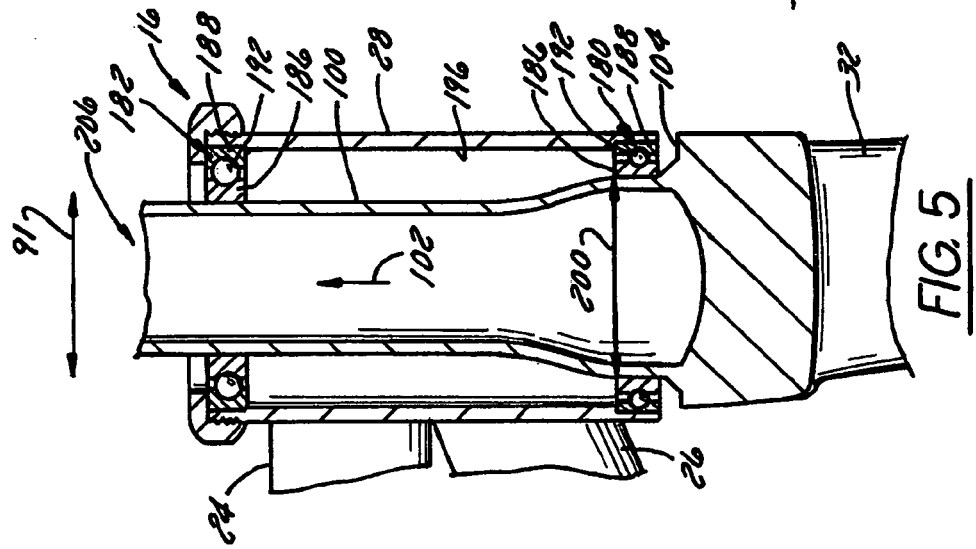
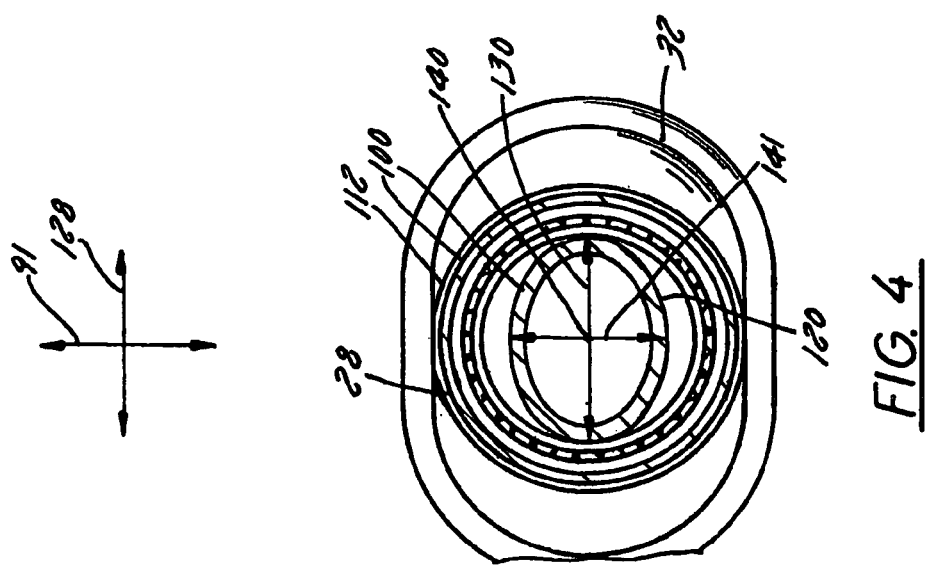

BICYCLE WITH ASYMMETRIC STEERER TUBE

BACKGROUND OF THE INVENTION

The present invention relates generally to bicycles and, more particularly, to a lightweight steerer tube and head tube assembly that provide improved handling and comfort performance.

A typical fork or steerer assembly generally includes a fork crown that cooperates with a pair of downward extending legs. A steerer tube extends in an upward direction from the fork crown and cooperates with a head tube of a bicycle frame. The steerer tube can be integrally formed with one or more of the fork crown and forks or the steerer tube and fork crown can be constructed with mating securing structures, such as geometric, threaded, and/or bonded connections. Regardless of the specific construction, the steerer tube is commonly centrally positioned relative to the fork crown and is secured to the fork crown so as to extend in a direction generally opposite the pair of fork legs.

The steerer tube, fork crown, and fork legs can be constructed of any of aluminum or metal-type materials, composite materials, and/or carbon based materials such as carbon fiber material and/or a glass fiber material. A stem and handlebar are commonly engaged with the steerer tube such that the head tube of the bicycle frame is captured between the stem/handlebar and the fork crown. A number of rolling support elements, such as bearings, are commonly disposed between the head tube and the steerer tube and facilitate generally smooth rotational movement of the steerer assembly relative to the bicycle frame.

A front wheel is commonly disposed between the fork legs and supports the forward portion of the bicycle. Although a portion of the loading imparted to the front wheel during use of the bicycle is absorbed by flexure of the respective portions of the steerer assembly, a majority of the front wheel load is communicated to the bicycle frame through the interaction of the steerer tube and the head tube. A portion of this loading is communicated to the rider through their interaction with the handlebars. Rider steering inputs are communicated in a generally reverse direction from the handlebars and through the steerer assembly to effectuate a desired turning operation. The communication of the impact and steering forces through the steerer assembly directly affects ride experience.

During riding, although the front wheel can be subjected to loading in a variety of radial directions, these loading are commonly directed in a longitudinal and a lateral direction. As used herein, the longitudinal direction generally refers to directions aligned with a longitudinal axis or a direction of travel of the bicycle. Understandably, the longitudinal direction includes both generally forward and generally rearward directions, or the fore and aft directions, relative to the longitudinal axis of the bicycle. The lateral directions refer to the generally right and generally left directions relative to the longitudinal axis of the bicycle. That is, the generally opposite left and right sides of the bicycle as compared to the forward and rearward portions of the bicycle.

Many riders' associate bicycle handling performance with the responsiveness of the front wheel assembly to steering inputs. The laterally oriented interaction between the steerer tube and the head tube is largely associated with the rider's perception of handling performance. Improved handling performance can be attained with increased lateral stiffness of the steering assembly. Said in another way, increasing the lateral stiffness of the steerer assembly provides a steering system that is more responsive to steering inputs.

Others have provided bicycles with a desired degree of steering responsiveness. Such systems include a larger diameter bearing support between the steerer tube and the head tube. Such a configuration offsets the lateral support in a direction laterally outboard of the longitudinal axis of the steering assembly. Unfortunately, such an approach has several detrimental effects on the overall construction of the bicycle and steerer assembly.

Such assemblies increase the size and mass of the respective components of the steering assembly thereby undesirably increasing the weight of the bicycle. Furthermore, such a configuration increases the rigidity of the steerer assembly in a generally radially uniform manner. That is, in addition to increasing the rigidity of the steerer assembly in the opposite lateral directions, such an approach also undesirably increase the rigidity in the generally opposite fore and aft directions. The increase in the fore and aft rigidity of the steerer assembly detrimentally affects the fore and aft stiffness performance of the steering assembly by communicating greater amounts of the fore and aft directed loading of the front wheel to the rider. As such, such systems adversely affect rider comfort by communicating a greater amount of road bumps and/or impacts to the hands of the rider.

Therefore, it would be desirable to have a steerer assembly with improved lateral and fore and aft stiffness performance. It is further desired to provide steerer assembly that can be efficiently and repeatably produced and is robust and lightweight.

BRIEF DESCRIPTION OF THE INVENTION

The present invention provides a steerer tube and method of supporting a steerer tube that overcomes one or more of the aforementioned drawbacks. A bicycle steerer tube in accordance with one aspect of the invention includes an oblong asymmetric cross section that is formed along a portion of the steerer tube. The asymmetric portion of the steerer tube has a first diameter that is generally aligned with an axis of rotation of the front wheel and a second diameter that is generally aligned with a plane of rotation of the front wheel. The first diameter is greater than the second diameter and provides lateral stiffness to the wheel assembly and the second diameter accommodates longitudinal impact absorption of the fork and wheel assembly.

Another aspect of the invention useable with one or more of the features of the above aspect discloses a bicycle steerer tube that includes a body having a first end that extends from a fork crown and a second end that extends toward a handlebar of a bicycle. The body of the steerer tube includes an asymmetric cross section that is formed between the first end and the second end and that is configured to be received in a head tube of the bicycle. The asymmetric cross section has a first diameter that is greater than a second diameter. The first diameter is oriented to be aligned with a pair of fork legs positioned on generally opposite ends of the fork crown and the second diameter is oriented to be generally transverse to the first diameter.

Another aspect of the invention that can be combined with one or more of the features of the above aspects discloses a bicycle assembly having a frame assembly that includes a seat tube and a head tube. The seat tube and the head tube are separated along a longitudinal axis of the frame assembly. A fork crown is positioned generally beneath the head tube and a pair of forks extends in a downward direction from generally opposite lateral sides of the fork crown. A steerer tube extends upward from the fork crown and into the head tube and includes a portion with an oblong cross section. The oblong cross section has a long axis that is oriented in a direction that is generally transverse to the longitudinal axis when the pair of forks are symmetrically positioned relative to the longitudinal axis.

Another aspect of the invention useable with one or more of the features of the above aspects discloses a method of supporting a bicycle steerer tube. A steerer tube body is provided that is shaped to cooperate with a head tube of a bicycle frame. A portion of the steerer tube body that is supported by the head tube is shaped to have a non-circular oblong cross section with a short axis aligned with a longitudinal axis of the bicycle frame and a long axis transverse to the short axis.

Another aspect of the invention useable with one or more of the features disclosed above includes forming the fork crown and the steerer tube from the same material. Preferably, the steerer tube according to one of more of the above aspects is formed of a carbon fiber material. More preferably, a fork crown is formed integrally with the steerer tube.

Another preferred aspect to the invention useable with one or more of the above aspects includes tapering the steerer tube from an end proximate the fork crown to a remote end. Another preferred aspect of the invention includes disposing the asymmetric, oblong, eccentric, or non-circular portion of the steerer tube between radially symmetric portions of the steerer tube. Preferably, the symmetric portion of the steerer tube that is remote from the fork crown extends a greater length of the steerer tube than the symmetric portion that is more proximate the fork crown and accommodates cooperation of the steerer tube with bicycle frame head tubes having different lengths.

These and various other features and aspects of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 2 is a lateral side elevation view of the steerer assembly removed from the bicycle of FIG. 1;

FIG. 3 is a front side elevation view of the steerer assembly shown in FIG. 2;

FIG. 4 is a cross section view of the steerer assembly taken along line 4-4 shown in FIGS. 3 and 4;

FIG. 5 is a longitudinally oriented cross section view of the steerer tube and head tube assembly along line 5-5 shown in FIG. 3; and FIG. 6 is a laterally oriented cross section view of the steerer tube and head tube assembly along line 6-6 shown in FIG. 2.

DETAILED DESCRIPTION OF THE PREFERRED EMBODIMENT

Figure 1:
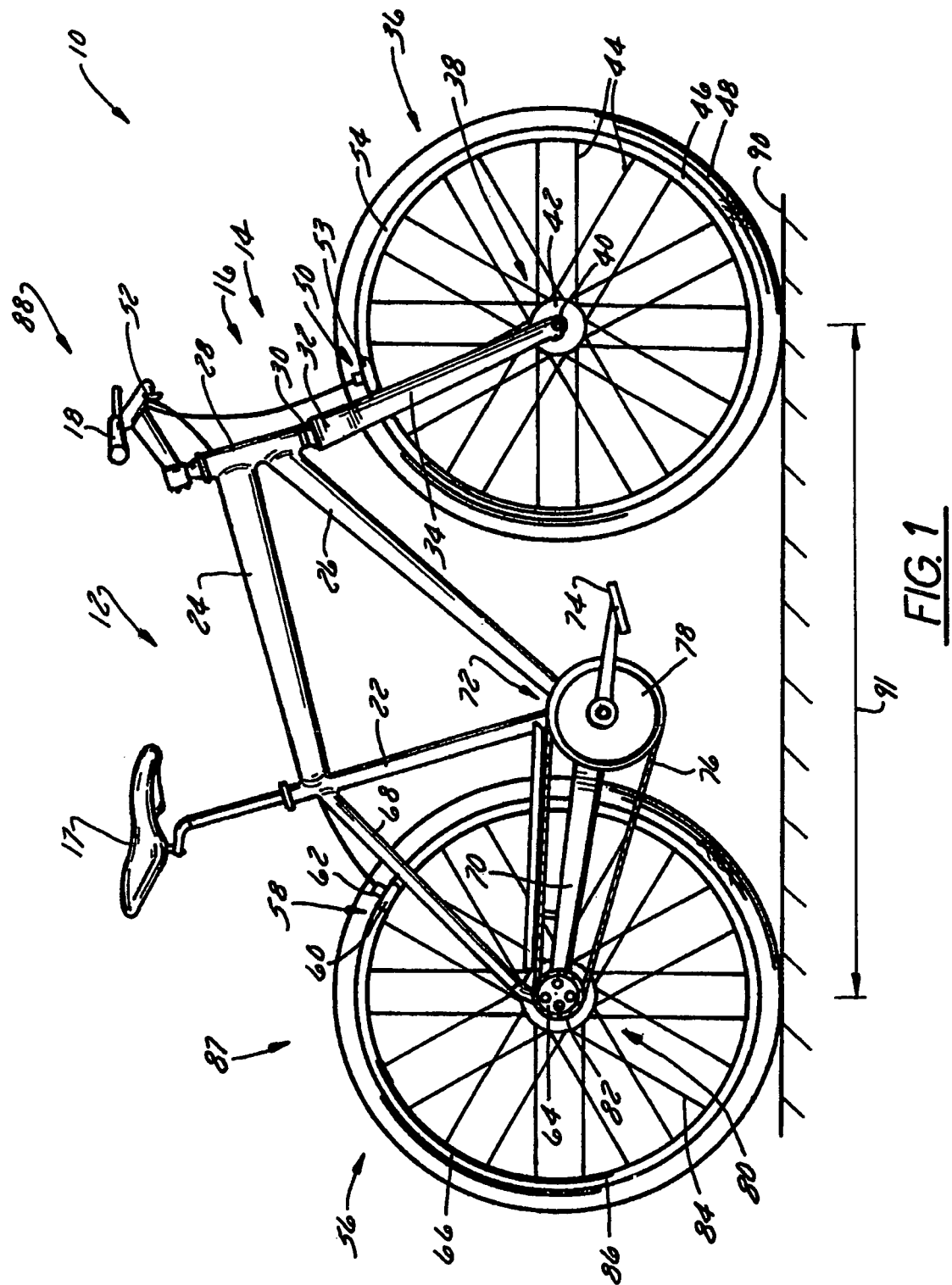
FIG. 1 is an elevational view of the bicycle equipped with a steerer assembly according to the present invention.

FIG. 1 shows a bicycle 10 having a frame 12 constructed to accommodate a fork assembly 14. Fork assembly 14 is supported by a steerer assembly 16 according to the present invention. Bicycle 10 includes a seat 17 attached to a seat post 20 that slidably cooperates with a seat tube 22 of frame 12. A handlebar 18 is positioned forward of seat 17 and is connected to steerer assembly 16 such that rotation of handlebar 18 rotates steerer assembly 16 relative to frame 12.

Frame 12 includes a top tube 24 and a down tube 26 that extend forwardly from generally opposite ends of seat tube 22 to a head tube 28 of frame 12. Handlebars 18 are connected to a stem or steerer tube 30 that passes through head tube 28 and is rotationally supported thereby. A fork crown 32 extends in a downward direction relative to head tube 28 and is constructed to form or support a pair of forks, fork blades or fork legs 34 that generally flank a front wheel assembly 36. Handlebar 18 may include a stem that is constructed to slidably engage an interior cavity of steerer tube 30.

Steerer tube 30 and fork crown 32 can be formed of a number of materials such as metal-type materials, such as aluminum, carbon-type materials, such as carbon fiber materials and/or composites, or combinations thereof. Steerer tube 30 may be secured to fork crown 32 or may be formed integrally therewith. Preferably, steerer tube 30 and fork crown 32 are formed of a carbon fiber material as one-piece. Regardless of the specific construction and configuration, and as described further below with respect to FIGS. 2-7, handlebar 18 is attached to bicycle 10 such that rotation of handlebar 18 rotates fork crown 32 about a longitudinal axis of steerer tube 30 and/or head tube 28.

Fork legs 34 extend from generally opposite lateral sides of fork crown 32 and are constructed to support front wheel assembly 36 at an end thereof or dropout assembly 38. Dropout assemblies 38 engage generally opposite sides of an axle 40 that is engaged with a hub 42 of front wheel assembly 36. A number of spokes 44 extend from hub 42 to a rim 46 of front wheel assembly 36. A tire 48 is engaged with rim 46 such that hub 42, rim 46, and tire 48 rotate in unison relative to fork legs 34.

Bicycle 10 includes a front brake assembly 50 having an actuator 52 attached to handlebars 18 and a pair of brake pads 53 positioned on generally opposite sides of front wheel assembly 36. Brake pads 53 are constructed to engage a brake wall 54 of rim 46 thereby providing a stopping or slowing force to front wheel assembly 36. Bicycle 10 includes a rear wheel assembly 56 that is also equipped with a brake assembly 58. Brake assembly 58 includes a pair of brake pads 60 that are manipulated by a caliper 62 that extends about generally opposite lateral sides of a rear wheel 66 of rear wheel assembly 56.

Rear wheel 66 is supported by a rear axle 64. Rear wheel brake assembly 58 interacts with rear wheel 66 in a manner similar to the association of front brake assembly 50 and front wheel assembly 36. Brake assemblies 50, 58 are merely exemplary of one brake assembly useable with the present invention. It is appreciated that either or both of front and rear wheel assemblies 36, 56 could be provided with other braking arrangements such as disc brake assemblies.

A seat stay 68 and a chain stay 70 offset rear axle 64 from a crankset 72. Crankset 72 includes a set of pedals 74 that is operationally connected to an endless drive such as a chain 76 via a gear set, chain ring, or sprocket 78. Rotation of chain 76 communicates a drive force to a gear cluster 80 positioned proximate rear axle 64. Gear cluster 80 is generally concentrically orientated with respect to rear axle 64 and includes a number of variable diameter gears.

Gear cluster 80 is operationally connected to a hub 82 of rear wheel 66. A number of spokes 84 extend radially between hub 82 and a rim 86 of rear wheel 66 of rear wheel assembly 56. As is commonly understood, rider operation of pedals 74 drives chain 76 thereby driving rear wheel 66 which in turn propels bicycle 10. Whereas rear wheel assembly 56 supports an aft or rearward end or portion 87 of bicycle 10, fork assembly 14 is constructed to support a forward end or portion 88 of bicycle 10 above a ground surface 90. Handlebar 18 is connected to frame 12 and fork assembly 14 via steerer assembly 16 such that operator manipulation of handlebar 18 is communicated to fork assembly 14 so as to turn, rotate, or pivot front wheel assembly 36 relative to frame 12 with respect to a longitudinal direction or axis, indicated by arrow 91, of bicycle 10. As is commonly understood, such manipulation of handlebar 18 steers bicycle 10 during riding.

It is appreciated that the construction of bicycle 10 shown in FIG. 1 is merely exemplary of a number of bicycle configurations. That is, whereas bicycle 10 is shown as what is commonly understood as a street or road bike, it is appreciated that a steerer assembly according to the present invention is applicable to other bicycle configurations such as mountain and/or dirt bike. It is further appreciated that the present invention is useable with bicycles having structures and/or features that differ from the specific construction disclosed above.

FIGS. 2 and 3 show steerer tube 30 removed from bicycle 10. Steerer tube 30 includes a body 100 that extends in an upward direction, indicated by arrow 102, relative to a top or upper surface 104 of fork crown 32. Preferably, body 100 includes an integral or inseparable steerer tube 30 and fork crown 32. Alternatively, it is envisioned that steerer tube 30 and fork crown 32 include overlapping portions or be otherwise configured to be secured to one another. As used herein, steerer tube 30 is that portion of steerer assembly 16 that extends in an upward direction relative to fork crown 32 and is configured to cooperate with head tube 28 so as to rotationally secure steerer assembly 16 to bicycle frame 12.

Steerer tube 30 of body 100 includes a first or lower radial portion 106, a radially asymmetric portion 108, and a second or upper radial portion 110. Lower radial portion 106 is generally adjacent upper surface 104 of fork crown 32 and includes a chamfer 112 that extends radially about steerer tube 30. Radially asymmetric portion 108 begins at or near chamfer 112 and extends a portion 114 of the overall length of steerer tube 30. Radially asymmetric portion 114 tapers inward relative to a longitudinal axis 140, indicated by the intersection of longitudinal and lateral diameters 120, 130 as shown in FIG. 4, of body 100 as it extends from lower radial portion 106 toward upper radial portion 110.

Referring to FIGS. 2 and 4, a longitudinal diameter, indicated by arrow 120, of steerer tube 30 gradually reduces from a diameter, indicated by arrow 122, associated with lower radial portion 106 to a diameter, indicated by arrow 124, associated with upper radial portion 110. FIGS. 3 and 4 show a lateral orientation, indicated by arrow 128, of steerer tube 30 relative to bicycle 10. The lateral orientation of steerer tube 30 is associated with the generally aligned orientation of alternate arms 132, 134 of fork crown 32.

Each of arms 132, 134 of crown 32 is oriented to cooperate with a respective fork leg 34. Fork legs 34 can be bonded or otherwise attached to arms 132, 134. One such construction is disclosed in Applicant's copending Patent Application Publication No. 2008/0303240 entitled "Bicycle Fork Assembly With Integral Crown and Steer Tube." The disclosure of which is incorporated herein. Alternatively, fork legs 34 may be formed integrally with steerer tube 30 and fork crown 32. Regardless of the particular construction modality and as is commonly understood, forks 34 extend in a downward direction from arms 132, 134 of crown 32 and are positioned to generally flank front wheel assembly 36.

Referring to FIGS. 3 and 4, body 100 includes a lateral diameter, indicated by arrow 130, that transitions from first radial portion 106 to upper radial portion 110. As compared to longitudinal diameter 120, lateral diameter 130 is maintained at a value that more nearly approximates the radial diameter 122 associated with lower radial portion 106 for a greater distance from upper surface 104 of fork crown 32. Both longitudinal and lateral diameters 120, 130 transition from lower radial portion 106 to upper radial portion 110. Comparing FIGS. 2 and 3, it can be seen that the rate of change of longitudinal diameter 120 at locations more proximate upper surface 104 of fork crown 32 is greater than the rate of change of lateral diameter 130 along the same portion of a longitudinal axis, indicated by arrow 140, of steerer tube body 100. Said in another way, the lateral diameter of steerer tube 30 is wider than the longitudinal diameter of the steerer tube 30 as body 100 transitions from the lower radial portion 106 to the upper radial portion 110. Preferably, for each cross section of body 100 that is perpendicular to the longitudinal axis 140 of steerer tube 30, lateral diameter 130 is larger than longitudinal diameter 120.

Referring to FIGS. 2-4, upper surface 104 of fork crown 32 and chamfer 112 are generally radially symmetric with respect to longitudinal axis 140 of steerer tube 30. Lateral diameter 130 of body 100 is tapered or gradually reduces from diameter 122 associated with chamfer 112 to diameter 124 associated with the upper radial portion 110. Similarly, longitudinal diameter 120 also gradually reduces such that steerer tube 30 is tapers inward toward axis 140 as it extends in direction 102 away from upper surface 104 of fork crown 32. One exemplary shape of steerer tube 30 has smallest longitudinal diameter that is approximately 70-75% of a widest lateral diameter of steerer tube 30. It is appreciated that such a ratio is merely exemplary and the present invention may be provided in virtually any ratio where the longitudinal diameter of the steerer tube is less than the lateral diameter of the steerer tube.

As best shown in FIG. 4, steerer tube 30 includes a number of cross-sections 141 along asymmetric portion 108 that are radially asymmetric but bilaterally symmetric along each of the longitudinal axis 91, 128. Such a construction provides that each cross-section 141 along asymmetric portion 108 has an oblong, non-circular, and radially asymmetric shape. Furthermore, along axial length associated with axis 140, each cross-section 141 includes a lateral diameter 130 that is larger than a longitudinal diameter 120. Preferably, longitudinal diameter 120 is not less than a diameter associated with upper radial portion 110. Although upper radial portion 110 could be provided in any of a number of sizes, upper radial portion 110 preferably has a diameter of about 1.125 inches or about 28.6 mm. Similarly, although lateral diameter 130 tapers from lower radial portion 106 to upper radial portion 110, and could be provided in a number of sizes, at it's widest portion, lateral diameter 130 is approximately 1.559 inches or 39.6 mm, and is about the same as the diameter of lower radial portion 130. Lateral diameter 130 is commonly colloquially referenced as having a one and one half inch diameter although the actual dimension of lateral diameter 130 is commonly slightly larger. It is appreciated however that the values provided above are merely exemplary values. As described below with respect to FIGS. 5 and 6, such a construction allows for fore and aft movement of flexure of fork assembly 14 while providing fairly robust lateral support in side to side directions commonly associated with lateral axis 128.

It is further appreciated that, during turning operations, longitudinal diameter 120 and lateral diameter 130 of steerer tube 30 rotate about the longitudinal axis 140 of steerer tube 30 relative to head tube 28 of bicycle 10. The orientation of lateral and longitudinal diameters 120, 130 remain aligned with the longitudinal and lateral loading of fork assembly 14 with respect the to the front wheel assembly 36. Said in another way, lateral diameter 130 remains oriented to be aligned with lateral loading of wheel assembly 36 and longitudinal diameter 120 remains oriented to be aligned with longitudinal loading of wheel assembly 36. The benefits of such an orientation is described further below with respect to the performance characteristics provided by steerer assembly 16.

FIGS. 5 and 6 are elevation cross section views of steerer assembly 16 in the longitudinal and lateral directions 91, 128, respectively. A lower bearing 180 and an upper bearing 182 are disposed between body 100 and head tube 28 of bicycle 10. Bearings 180, 182 provide rotatable support at the generally opposite ends of steerer tube 30. Each of lower and upper bearings 180, 182 include an inner member 186, an outer member 188, and a number of roller elements 192 that are disposed therebetween. It is appreciated that one or both of the inner members 186 of upper and lower bearing 180, 192 could be integrally formed with body 100 of steerer tube 30. It is similarly appreciated that the outer members 188 one or both of upper and lower bearings 180, 182 could be formed integrally with respect to an inner surface 196 of head tube 28.

The inner member 186 of lower bearing 180 seats upon chamfer 112 and outer member 188 of lower bearing 186 cooperates with head tube 28 such that a gap 198 is maintained between head tube 28 and upper surface 104 of fork crown 32. Such a construction ensures that steerer assembly 16 can rotate smoothly relative to fork crown 32. As shown in FIG. 5, a lowermost asymmetric cross section 200 of steerer tube 30 is shown as a line and is positioned beyond the interface between steerer tube 30 and lower bearing 180. Such an orientation provides a preferred radial support of the steerer tube 30 at lower bearing 180. As shown in FIG. 6, with respect to lateral direction 128, steerer tube 30 fully engages inner member 186 of lower bearing 180. Such a configuration ensures that the lower end steerer tube 30 is fully supported by bearing 180 and provides close proximity of the deflectable portion of the steerer tube 30 proximate the respective lower support.

The inner and outer members 186, 188 of upper bearing 182 cooperate with the upper radial portion 110 of steerer tube 30 and inner surface 196 of head tube 28, respectively. Upper radial portion 110 of steerer tube 30 extends a greater length of steerer tube 30 than lower radial portion 106 so that fork assembly 14 can be used with a variety of bicycle constructions having a variety of lengths of head tube 28. Regardless of the length of head tube 28, asymmetric portion 108 of steerer tube 30 is preferably positioned between the generally opposite ends of head tube 28.

Steerer tube 30 includes an optional cavity 206 formed in body 100. Optional cavity 206 can extend a majority of the length of steerer tube 30 and provides a lighter steerer assembly 16. Such a construction forms a steerer tube wall 208 that has a thickness that is selected to withstand to withstand the loaded interaction between steerer tube 30 and head tube 28. Furthermore, optional cavity 206 is preferably configured to cooperate with expandable structures commonly associated with securing handlebar 18 to steerer tube 30. Alternatively, it is envisioned that steerer tube 30 could be provided as a substantially solid body and handlebar 18 provided with an offset or stem configured to be clamped to an exterior surface of handlebar 18. Minimally, steerer tube 30 is provided an asymmetric cross section that is disposed between handlebar 18 and fork crown 32.

Testing has confirmed that asymmetric cross section 141 contributes to the lateral and longitudinal stiffness performance of the bicycle equipped with a steerer assembly 16 according to the present invention. With respect to bicycle operation, the forces subjected to front wheel assembly 36 that are generally aligned with the plane of rotation of the front wheel are commonly referred to as impact forces. Such longitudinal forces are further classified as braking forces, or forces that tend to deflect the forks rearward toward the rider, and comfort forces, or forces that tend to deflect the forks in a forward direction generally away from the rider. Portions of the braking and comfort forces are communicated to the rider through the rider's interaction with the handlebars.

During testing, steerer assembly 16 has been shown to provide more desirable lateral and longitudinal stiffness performance. The test values were attained during testing during which the fork assembly was maintained in a generally horizontal position and the dropouts were subjected to a load in a cantilevered fashion so as displace the dropouts relative to an upper end of the steerer assembly 16. Such testing yielded results associated with the load, in units Newton or pound force, and a given displacement distances, in units millimeter or inch. The English and metric units are associated by the equation N/mm×5.706=lbf/in.

Steerer assembly 16 has been shown to provide a braking and comfort force values of approximately 496.422 lbf/in (about 87 N/mm) and about 499.275 lbf/in (about 87.5 N/mm) whereas a comparable assembly having a steerer assembly with a generally concentric steerer tube has been shown to provide a braking force value of approximately 516.393 lbf/in (about 90.5 N/mm) and a comfort force value of approximately 511.828 lbf/in (about 89.7 N/mm). Said in another way, steerer tube 30 reduces the transmission of the forces oriented in longitudinal direction 91 to the rider of bicycle 10. Still in other testing, longitudinal stiffness performance was measured to decrease by approximately 85.59 lbf/in (about 15 N/mm) or about a 9% decrease in fore and aft rigidity or stiffness of the steerer assembly. Accordingly, steerer assembly 16 provides more desirable braking and comfort performance.

Decreasing the fore-aft stiffness of the steerer assembly 16 provides two distinct advantages as compared to prior art steerer tube assemblies. A first advantage is a decrease in the amount of force that is transmitted to the rider therein increasing the comfort level associated with the use of bicycle 10. A second advantage is the distribution of the load associated with testing and/or frontal impacts over a greater duration of an impact or deflection event. The increased compliance of steerer assembly 16 to fore and aft loading reduces the peak load that must be accommodated by steerer assembly 16 and the other structural members of the fork and bicycle assembly. Accordingly, steerer assembly 16 can be constructed in a lightweight manner capable of withstanding the fore and aft impact loading as compared to heavier steerer assemblies or constructed to provide greater fore and aft impact performance as compared to steerer assemblies of comparable weight.

With respect to lateral stiffness performance, the lateral stiffness performance of a bicycle steerer assembly can be correlated to the steering responsiveness. That is, rather than deflecting or rotating when subjected to a steering instruction input, most riders prefer a more rigid lateral interaction with the steerer assembly. When compared to other prior steerer assemblies that provide a lateral stiffness measure of about 224.256 lbf/in (about 39.3 N/mm), steerer assembly 16 provides lateral stiffness of about 282.447 lbf/in (about 49.5 N/mm). Said in another way, steerer tube 30 provides more rigid lateral support of steerer tube 30 so as to provide efficient communication of the steering inputs and lateral handling characteristics of bicycle 10. Still in other testing, lateral stiffness performance was measured at an increase of about 85.59 lbf/in (about 15 N/mm) or approximately a 42% increase in lateral stiffness performance. Accordingly, steerer assembly provides more desirable lateral performance comfort. The asymmetric nature of steerer tube 30 allows for improvements in both the forward and rearward directed impact braking and comfort performance and the lateral handling and comfort performance of bicycle 10.

Therefore, one embodiment of the invention includes bicycle steerer tube having a body with a first end that extends from a fork crown and a second end that extends toward a handlebar of a bicycle. An asymmetric cross section that is configured to be received in a head tube of the bicycle is formed between the first end and the second end of the body. The asymmetric cross section includes a first diameter and a second diameter that is generally transverse to the first diameter. The first diameter is greater than a second diameter and is oriented to be aligned with a pair of fork arms that are positioned on generally opposite ends of the fork crown.

Another embodiment of the invention combinable with one or more features of the embodiment above includes a bicycle assembly having a frame assembly that includes a seat tube and a head tube that are separated along a longitudinal axis of the frame assembly. A fork crown is positioned generally beneath the head tube and each of a pair of forks extends in a generally downward direction from generally opposite lateral sides of the fork crown. The bicycle assembly includes a steerer tube that extends upward from the fork crown and into the head tube. A portion of the steerer tube has an oblong cross section that has a long axis that is oriented in a direction that is generally transverse to the longitudinal axis of the bicycle when the pair of forks are symmetrically positioned relative to the longitudinal axis of the bicycle.

Another embodiment of the invention combinable with one or more of the features of the above embodiments includes a method of supporting a bicycle steerer tube. A steerer tube body is provided that is shaped to cooperate with a head tube of a bicycle frame. A portion of the steerer tube body that is supported by the head tube is shaped to have a non-circular oblong cross section with a short axis aligned with a longitudinal axis of the bicycle frame and a long axis transverse to the short axis.

The present invention has been described in terms of the preferred embodiment, and it is recognized that equivalents, alternatives, and modifications, aside from those expressly stated, are possible and within the scope of the appending claims.

Understandably, the present invention has been described above in terms of the preferred embodiment. It is recognized that various alternatives and modifications may be made to these embodiments which are within the scope of the appending claims.

What is claimed is:

1. A bicycle steerer tube comprising:
a body having a first end that extends from a fork crown and a second end that extends toward a handlebar of a bicycle;
an asymmetric cross section formed between the first end and the second end and configured to be received in a head tube of the bicycle; and
the asymmetric cross section having a first diameter that is oriented to be aligned with a pair of fork arms positioned on generally opposite ends of the fork crown and a second diameter that is generally transverse to the first diameter, the first diameter being greater than the second diameter.

2. The bicycle steerer tube of claim 1 wherein the first diameter and the second diameter each gradually reduce as the asymmetric cross section is taken at locations along a length of the body in a direction away from the fork crown.

3. The bicycle steerer tube of claim 2 wherein a rate of change of the first diameter is different than a rate of change of the second diameter along the length of the body.

4. The bicycle steerer tube of claim 3 wherein the first diameter is always greater than the second diameter.

5. The bicycle steerer tube of claim 1 wherein the body has a radially symmetric cross section outboard of the asymmetric cross section at each of the first end and the second end of the body.

6. The bicycle steerer tube of claim 5 wherein the radially symmetric cross section proximate the second end extends a greater a length of the body than the radially symmetric cross section proximate the first end.

7. The bicycle steerer tube of claim 1 wherein the body is formed integrally with the fork crown from a carbon fiber material.

8. A bicycle assembly comprising:
a frame assembly having a seat tube and a head tube that are separated along a longitudinal axis of the frame assembly;
a fork crown positioned generally beneath the head tube;
a pair of forks that extend in a downward direction from generally opposite lateral sides of the fork crown; and
a steerer tube that extends upward from the fork crown and into the head tube, the steerer tube having a portion with an oblong cross section, the oblong cross section having a long axis oriented in a direction that is generally transverse to the longitudinal axis when the pair of forks are symmetrically positioned relative to the longitudinal axis.

9. The bicycle assembly of claim 8 further comprising at least one bearing disposed between the head tube and the steerer tube and configured to cooperate with the oblong cross section such that the oblong cross section begins proximate the at least one bearing.

10. The bicycle assembly of claim 8 wherein the fork crown and the head tube are inseparable and formed from a carbon fiber material.

11. The bicycle assembly of claim 8 further comprising a radially symmetric chamfer that extends about the steerer tube proximate a top surface of the fork crown.

12. The bicycle assembly of claim 11 wherein the steerer tube includes a radially symmetric portion at an end of the steerer tube opposite the fork crown.

13. The bicycle assembly of claim 12 further comprising a bearing configured to be disposed between the radially symmetric portion of the steerer tube and an upper end of the head tube.

14. The bicycle assembly of claim 12 wherein the radially symmetric portion of the steerer tube extends a length of the steerer tube to allow cooperation of the steerer tube with head tubes of different lengths.

* * * * *